United States Patent
Battle et al.

(10) Patent No.: US 10,296,337 B2
(45) Date of Patent: May 21, 2019

(54) PREVENTING PREMATURE READS FROM A GENERAL PURPOSE REGISTER

(71) Applicant: International Business Machines Corporation, Armonk, NY (US)

(72) Inventors: Steven J. Battle, Austin, TX (US); Owen Chiang, Austin, TX (US); Sam G. Chu, Round Rock, TX (US); Saiful Islam, Austin, TX (US); Dung Q. Nguyen, Austin, TX (US); David R. Terry, Austin, TX (US); Eula A. Tolentino, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 15/075,771

(22) Filed: Mar. 21, 2016

(65) Prior Publication Data

US 2017/0269936 A1  Sep. 21, 2017

(51) Int. Cl.
 *G06F 9/30* (2018.01)
 *G06F 9/38* (2018.01)

(52) U.S. Cl.
 CPC ...... *G06F 9/30098* (2013.01); *G06F 9/30029* (2013.01); *G06F 9/3836* (2013.01)

(58) Field of Classification Search
 CPC .................................................. G06F 9/30098
 See application file for complete search history.

(56) References Cited

U.S. PATENT DOCUMENTS

| | | | |
|---|---|---|---|
| 5,546,554 A | 8/1996 | Yung et al. | |
| 5,546,597 A | 8/1996 | Martell et al. | |
| 5,564,118 A * | 10/1996 | Steely, Jr. | G06F 9/30043 |
| | | | 712/240 |
| 5,898,853 A | 4/1999 | Panwar et al. | |
| 5,941,983 A * | 8/1999 | Gupta | G06F 9/3836 |
| | | | 712/214 |
| 6,334,182 B2 | 12/2001 | Merchant et al. | |
| 6,735,682 B2 | 5/2004 | Segelken et al. | |
| (Continued) | | | |

OTHER PUBLICATIONS

Sohi et al., "Instruction Issue Logic for High-Performance, Interruptable Pipelined Processors", Proceedings of the 14th Annual International Symposium on Computer Architecture (ISCA'87), Jun. 1987, pp. 27-34, ACM New York, NY, USA, DOI: 10.1145/30350.30354.

(Continued)

*Primary Examiner* — Andrew Caldwell
*Assistant Examiner* — Michael J Metzger
(74) *Attorney, Agent, or Firm* — Nathan M. Rau (57) ABSTRACT

Methods and apparatus for preventing premature reads from a general purpose register (GPR) including receiving an instruction comprising a source operand identifying a source GPR entry; setting a read-enabled flag based on a value in a particular entry of a source ready vector; if the read-enabled flag indicates data in the source GPR entry is ready for reading, dispatching the received instruction, including performing a read operation of the data in the source GPR entry; and if the read-enabled flag indicates data in the source GPR entry is not ready for reading, dispatching the received instruction without performing a read operation of the data in the source GPR entry.

17 Claims, 9 Drawing Sheets

(56) References Cited

U.S. PATENT DOCUMENTS

| | | | | |
|---|---|---|---|---|
| 2009/0063823 A1* | 3/2009 | Burky | ............ | G06F 9/3838 |
| | | | | 712/216 |
| 2014/0244967 A1* | 8/2014 | Ingle | ............ | G06F 9/30018 |
| | | | | 712/3 |
| 2016/0371091 A1* | 12/2016 | Brownscheidle | ..... | G06F 9/3836 |
| 2016/0378496 A1* | 12/2016 | Gray | ............ | G06F 9/38 |
| | | | | 712/206 |

OTHER PUBLICATIONS

Huang et al., "Energy-Efficient Hybrid Wakeup Logic", Proceedings of the 2002 International Symposium on Low Power Electronics and Design (ISLPED'02), Aug. 2002, pp. 196-201, ACM New York, NY, USA, ISBN: 1-58113-475-4.

\* cited by examiner

PREVENTING PREMATURE READS FROM A GENERAL PURPOSE REGISTER

BACKGROUND

Field of the Invention

The field of the invention is data processing, or, more specifically, methods, apparatus, and processors for preventing premature reads from a general purpose register (GPR).

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY

Methods and apparatus for preventing premature reads from a general purpose register (GPR) are disclosed in this application. Preventing premature reads from a GPR includes receiving an instruction comprising a source operand identifying a source GPR entry; setting a read-enabled flag based on a value in a particular entry of a source ready vector, wherein each of the source ready vector entries corresponds with an entry in the GPR, a value in a source ready vector entry indicates whether data in the corresponding GPR entry is ready for reading, and the particular entry corresponds to the source GPR entry identified in the source operand; if the read-enabled flag indicates data in the source GPR entry is ready for reading, dispatching the received instruction, including performing a read operation of the data in the source GPR entry; and if the read-enabled flag indicates data in the source GPR entry is not ready for reading, dispatching the received instruction without performing a read operation of the data in the source GPR entry.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
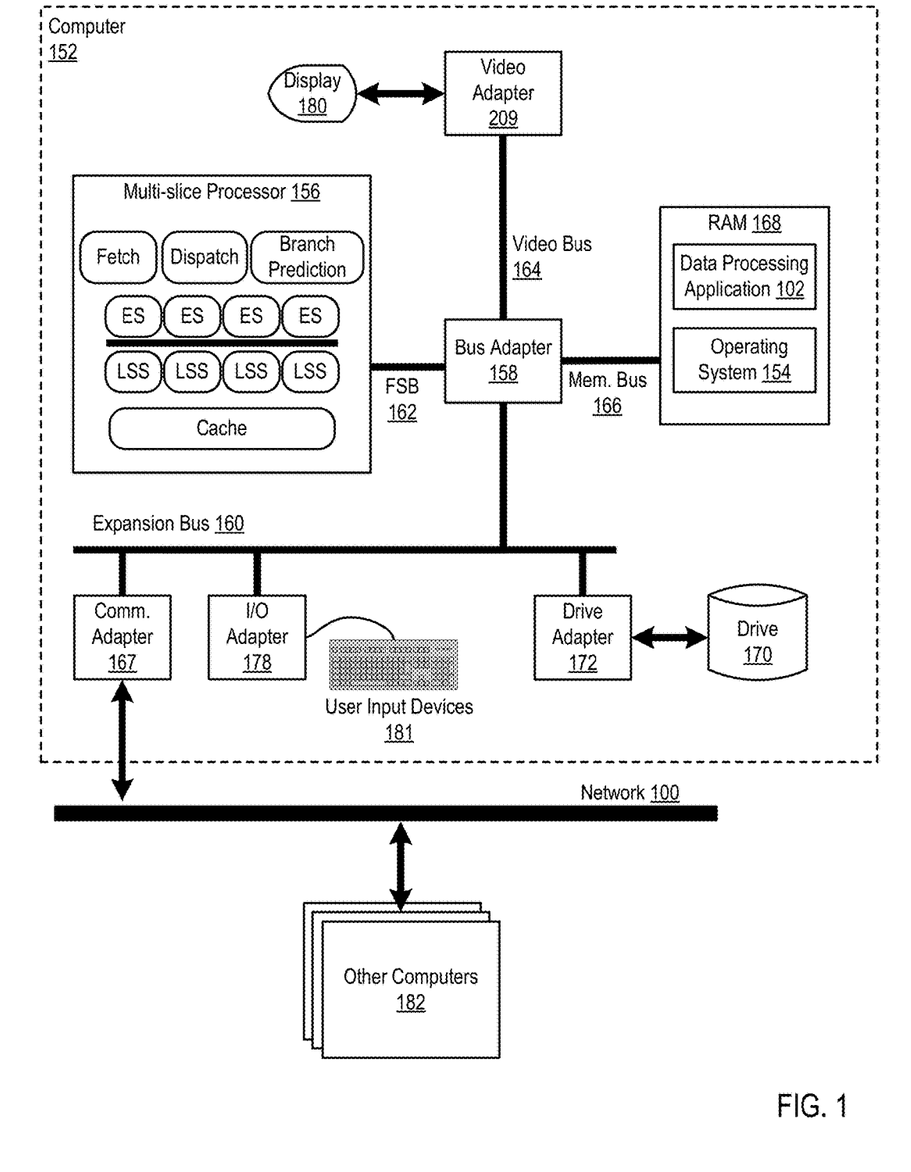
FIG. 1 sets forth an example system configured for preventing premature reads from a general purpose register (GPR).

Exemplary methods and apparatus for preventing premature reads from a general purpose register (GPR) in a computer processor in accordance with the present invention are described with reference to the accompanying drawings, beginning with FIG. 1. FIG. 1 sets forth a block diagram of an example system configured for preventing premature reads from a GPR in a computer processor according to embodiments of the present invention. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS'). Each execution slice may be configured to provide components that support execution of instructions: an issue queue, a general purpose register (GPR), a history buffer, an arithmetic logic unit (212) (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
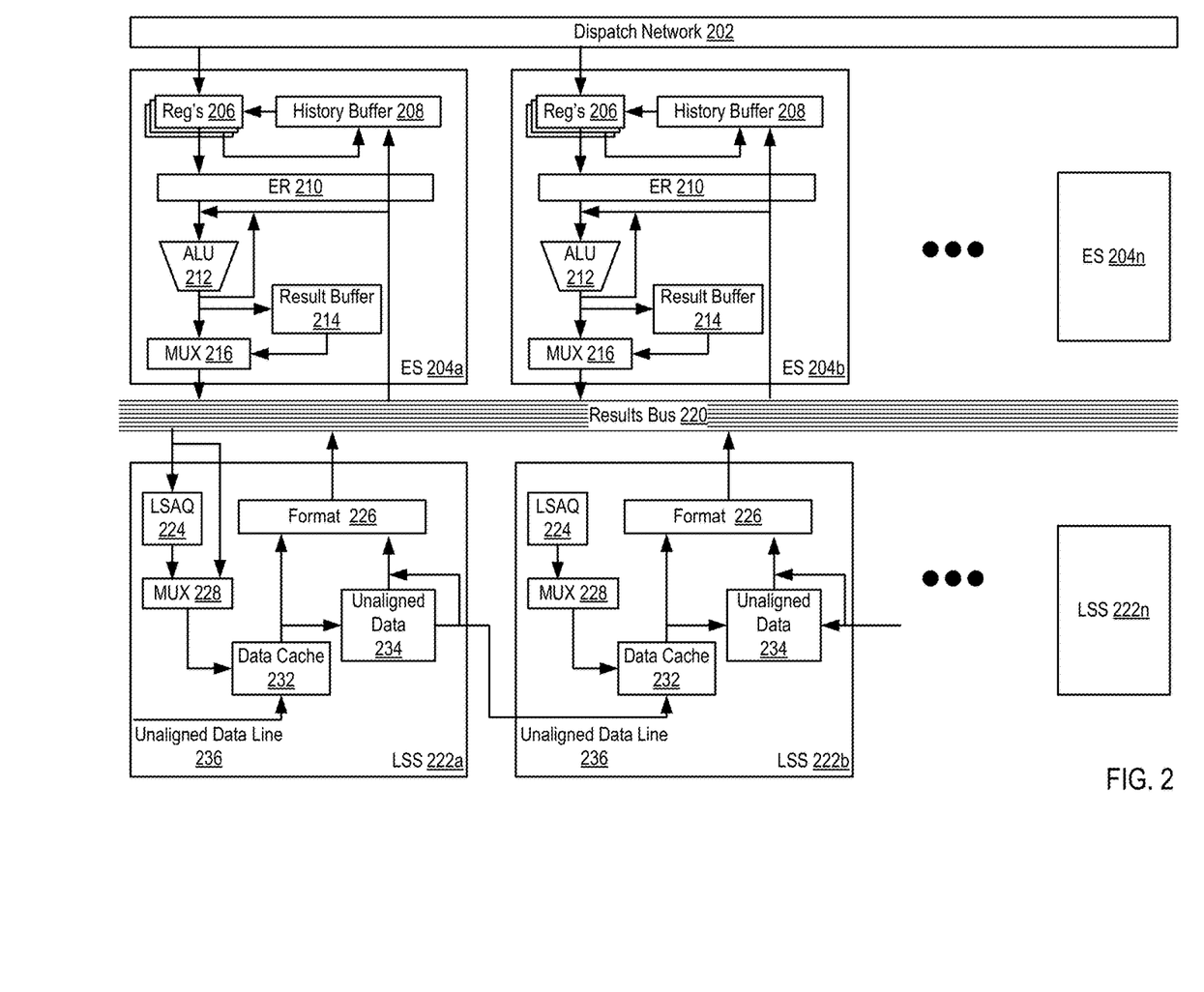
FIG. 2 sets forth an example system configured for preventing premature reads from a GPR.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes a general purpose register (206) and a history buffer (208). The general purpose register and history buffer may sometimes be referred to as the mapping facility, as the registers are utilized for register renaming and support logical registers.

The general purpose register (206) is configured to store the youngest instruction targeting a particular logical register and the result of the execution of the instruction. A logical register is an abstraction of a physical register that enables out-of-order execution of instructions that target the same physical register.

When a younger instruction targeting the same particular logical register is received, the entry in the general purpose register is moved to the history buffer. The history buffer (208) may be configured to store many instructions targeting the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit or to a load slice (222a-222n) via the results bus (220).

The arithmetic logic unit depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus may be configured in a variety of manners and be composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then by issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a queue (224), a multiplexer (228), a data cache (232), unaligned data logic (234) and formatting logic (226). The queue receives load and store operations to be carried out by the load/store slice (222).

The unaligned data logic (234) of each slice is coupled to the unaligned data logic of another slice through the unaligned data line (236). The unaligned data logic (234) enables data to be stored and retrieved across multiple load/store slices. The formatting logic (226) formats data into a form that may be returned on the results bus (220) to an execution slice as a result of a load instruction.

Figure 3:
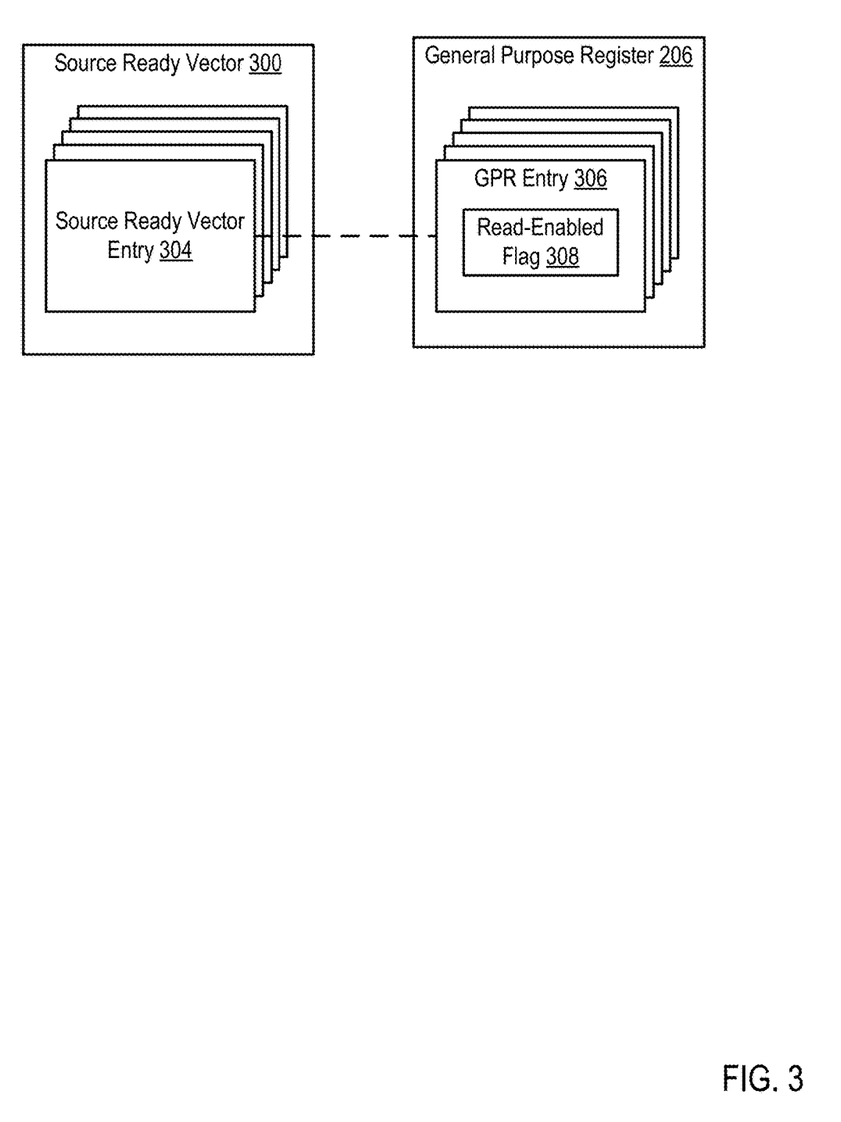
FIG. 3 sets forth an example system configured for preventing premature reads from a GPR.

For further explanation, FIG. 3 sets forth a block diagram of a portion of a multi-slice processor according to embodiments of the present invention. The example multi-slice processor of FIG. 3 includes a source ready vector (300) and a general purpose register (206). The source ready vector (300) includes a number of source ready vector entries (304). The general purpose register (206) includes a number of GPR entries (306), and each GPR entry (306) may include a read-enabled flag (308). Each source ready vector (304) corresponds to a GPR entry (306).

Figure 4:
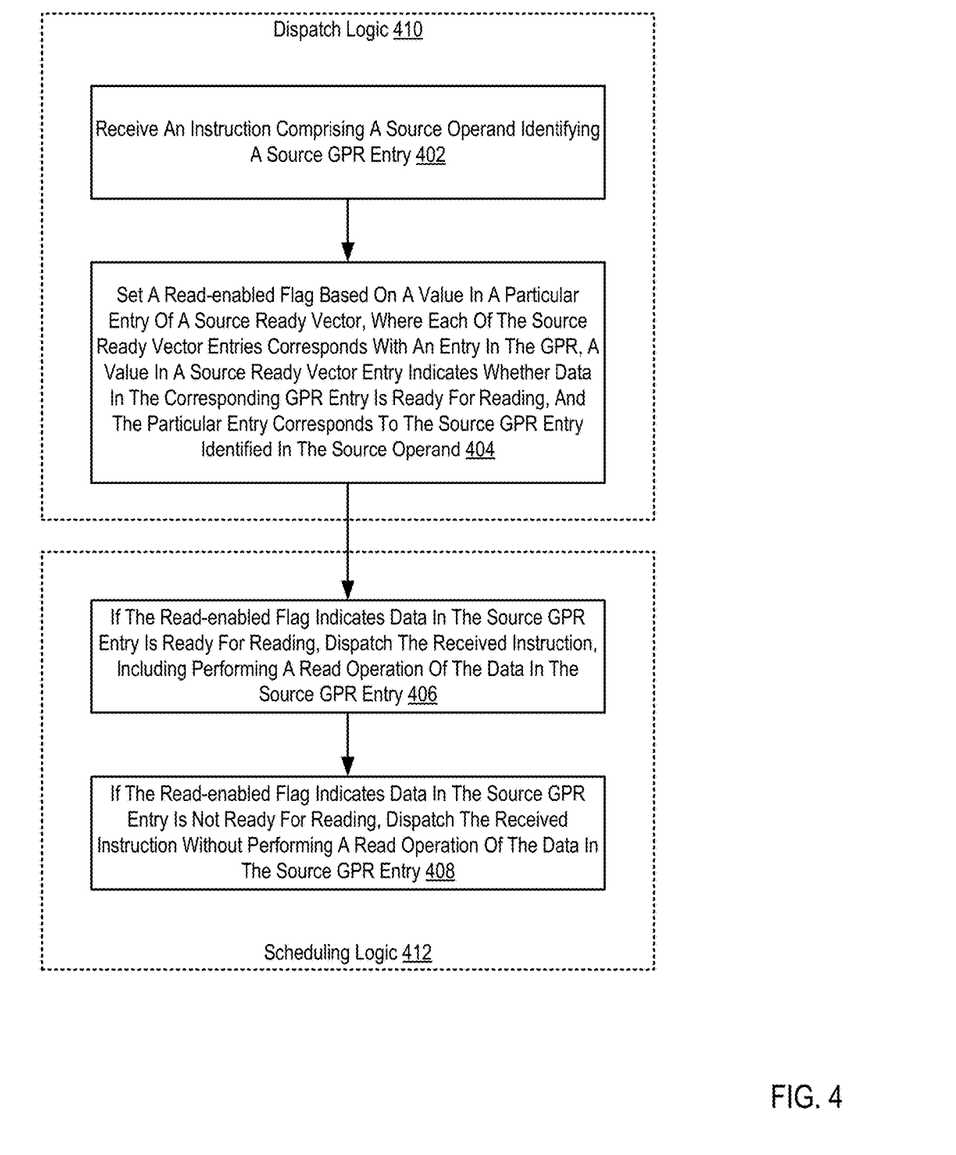
FIG. 4 sets forth a flow chart illustrating an exemplary method for preventing premature reads from a GPR.

For further explanation, FIG. 4 sets forth a flow chart illustrating an exemplary method for preventing premature reads from a general purpose register (GPR) according to embodiments of the present invention that includes receiving (402) an instruction comprising a source operand identifying a source GPR entry. The term "source" as used here refers to data to be used or manipulated in execution of an instruction. In this specification, a GPR entry may be characterized as a source entry or a target entry. A source GPR entry refers to an entry in the GPR that contains or will contain data to be used as a source of an instruction. A target GPR entry refers to an entry in the GPR to which an instruction will store data resulting from execution of the instruction.

Receiving (402) an instruction comprising a source operand identifying a source GPR entry may be carried out by receiving an internal operation instruction (IOP) that includes one or more source operands. A source operand may correspond to a portion of the received instruction that identifies data to be processed according to the instruction to produce result data. Each source operand may identify a source GPR entry using a key or address corresponding to the source GPR entry. Receiving (402) an instruction comprising a source operand identifying a source GPR entry may further be carried out by decoding the source operand to obtain a key identifying an entry in the GPR, such as the source GPR entry.

FIG. 4 also includes setting (404) a read-enabled flag based on a value in a particular entry of a source ready vector. Each of the source ready vector entries corresponds with an entry in the GPR. A value in a source ready vector entry indicates whether data in the corresponding GPR entry is ready for reading. The 'particular entry' corresponds to the source GPR entry identified in the source operand. Setting (404) a read-enabled flag based on a value in a particular entry of a source ready vector may be carried out by setting, toggling, switching, or otherwise altering a value stored as a read-enabled flag. The read-enabled flag may be stored as a value in the source GPR entry. For example, the read-enabled flag may be stored as the first, last, or $n^{th}$ bit in the source GPR entry. The read-enabled flag may alternatively be stored elsewhere as part of the GPR or in a location separate and distinct from the GPR.

The source ready vector may be a collection of values, such as binary bits. Each entry in the source ready vector may be identified using a key or other addressing mechanism. Further, each entry in the source ready vector may be identified using the same key used to access the source GPR entry, or may be identified using a key that is derived from the key used to access the source GPR entry. Each entry in the source ready vector may itself be a vector of values, such as a bit string.

The source ready vector may be stored separately from the GPR. The source ready vector may be stored in a location separate and distinct from the GPR. For example, the source ready vector may be stored at a storage location within the execution slice or load/store slice configured to store the source ready vector.

Receiving (402) an instruction comprising a source operand identifying a source GPR entry and setting (404) a read-enabled flag based on a value in a particular entry of a source ready vector may be carried out by the dispatch logic (410), other logic, or other mechanism capable of receiving (402) an instruction comprising a source operand identifying a source GPR entry and setting (404) a read-enabled flag based on a value in a particular entry of a source ready vector.

If the read-enabled flag indicates data in the source GPR entry is ready for reading, the method of FIG. 4 continues by dispatching (406) the received instruction, including performing a read operation of the data in the source GPR entry. Determining whether the read-enabled flag indicates data in the source GPR entry is ready for reading may be carried out by reading the value stored as the read-enabled flag for the source GPR entry. The read-enabled flag may be stored in, and read from, the source GPR entry.

Dispatching (406) the received instruction, including performing a read operation of the data in the source GPR entry may be carried out by obtaining the data from the source GPR entry and providing the data to a multi-slice processor for processing according to the instruction. For example, scheduling logic may read the read-enabled flag for the source GPR entry and determine that the read-enable flag indicates the data in the source GPR entry is ready for reading (e.g., by determining a '1' bit is stored as the read-enabled flag). Based on the determination, the scheduling logic may read the data at the source GPR entry and provide that data to an execution unit for execution of the instruction.

If the read-enabled flag indicates data in the source GPR entry is not ready for reading, the method of FIG. 4 continues by dispatching (408) the received instruction without performing a read operation of the data in the source GPR entry. Dispatching (408) the received instruction without performing a read operation of the data in the source GPR entry may be carried out by obtaining data corresponding to the data in the source GPR entry using other means. For example, scheduling logic may read the read-enabled flag for the source GPR entry and determine that the read-enable flag indicates the data in the source GPR entry is not ready for reading (e.g., by determining a '0' bit is stored as the read-enabled flag). Based on the determination, the scheduling logic may use other means to obtain the data. Obtaining the data by other means may include bypassing the GPR, using data forwarding techniques, or waiting for the data to be provided to the scheduling logic.

Determining whether the read-enabled flag indicates data in the source GPR entry is ready for reading, dispatching (406) the received instruction, including performing a read operation of the data in the source GPR entry, and dispatching (408) the received instruction without performing a read operation of the data in the source GPR entry may be carried out by the scheduling logic (412), other logic, or other mechanism capable of determining whether the read-enabled flag indicates data in the source GPR entry is ready for reading, dispatching (406) the received instruction, including performing a read operation of the data in the source GPR entry, and dispatching (408) the received instruction without performing a read operation of the data in the source GPR entry.

Figure 5:
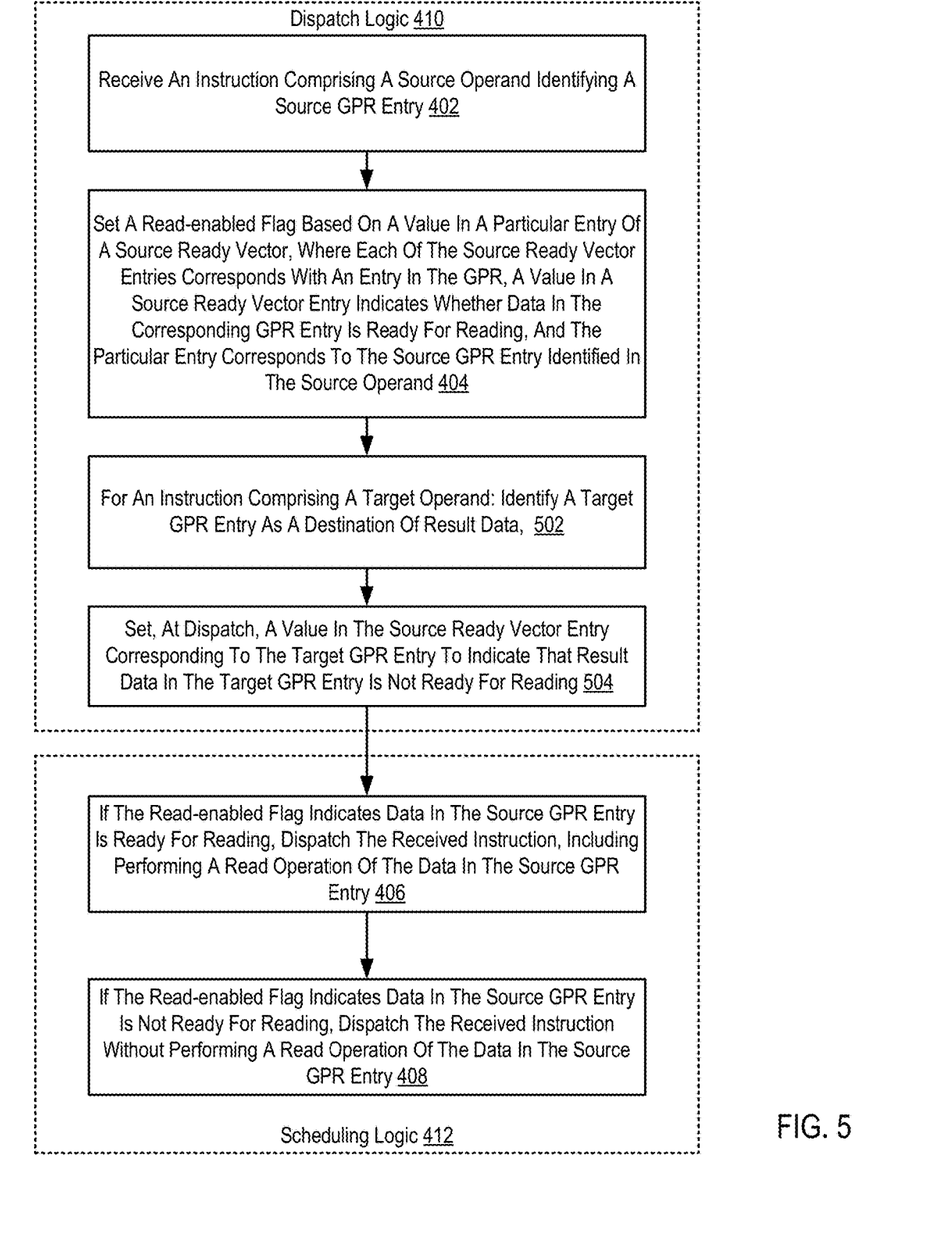
FIG. 5 sets forth a flow chart illustrating an exemplary method for preventing premature reads from a GPR.

For further explanation, FIG. 5 sets forth a flow chart depicting another method for preventing premature reads from a GPR according to embodiments of the present invention. The method of FIG. 5 is similar to the method of FIG. 4 in that the method of FIG. 5 also includes receiving (302) an instruction comprising a source operand identifying a source GPR entry; setting (304) a read-enabled flag based on a value in a particular entry of a source ready vector, wherein each of the source ready vector entries corresponds with an entry in the GPR, a value in a source ready vector entry indicates whether data in the corresponding GPR entry is ready for reading, and the particular entry corresponds to the source GPR entry identified in the source operand; if the read-enabled flag indicates data in the source GPR entry is ready for reading, dispatching (306) the received instruction, including performing a read operation of the data in the source GPR entry; and if the read-enabled flag indicates data in the source GPR entry is not ready for reading, dispatching (308) the received instruction without performing a read operation of the data in the source GPR entry.

The method of FIG. 5 differs from the method of FIG. 4, however, in that the method of FIG. 5 includes, for an instruction comprising a target operand, identifying (502) a target GPR entry as a destination of result data, and setting (504), at dispatch, a value in the source ready vector entry corresponding to the target GPR entry to indicate that result data in the target GPR entry is not ready for reading. A target operand may correspond to a portion of an instruction that identifies a location at which result data of the instruction is to be stored. An instruction may include both a target operand and a source operand. Data corresponding to the source operand may be processed according to the received instruction, and the result data from the processing is stored at the target GPR entry. The target operand may identify the target GPR entry using a key or address corresponding to the target GPR entry.

Setting (504), at dispatch, a value in the source ready vector entry corresponding to the target GPR entry to indicate that result data in the target GPR entry is not ready for reading may be carried out by switching a bit or vector at the entry in the source ready vector corresponding to the target GPR entry. The value, bit, or vector in the source ready vector may be, for example, switched from a '1' value to a '0' value, where the '1' value indicates that the result data in the target GPR entry is ready for reading, and where the '0' value indicates that the result data in the target GPR entry is not ready for reading. For example, the dispatch logic may receive an instruction containing both a source operand and a target operand. Because result data from the instruction will be stored at the target GPR entry identified in the target operand, but has not yet been stored, the dispatch logic tracks the readiness of the data in the target GPR entry by setting the value in the source ready vector. Another instruction attempting to read from the target GPR entry may be prevented from doing so because the value in the source ready vector indicates that the data is not ready for reading.

Figure 6:
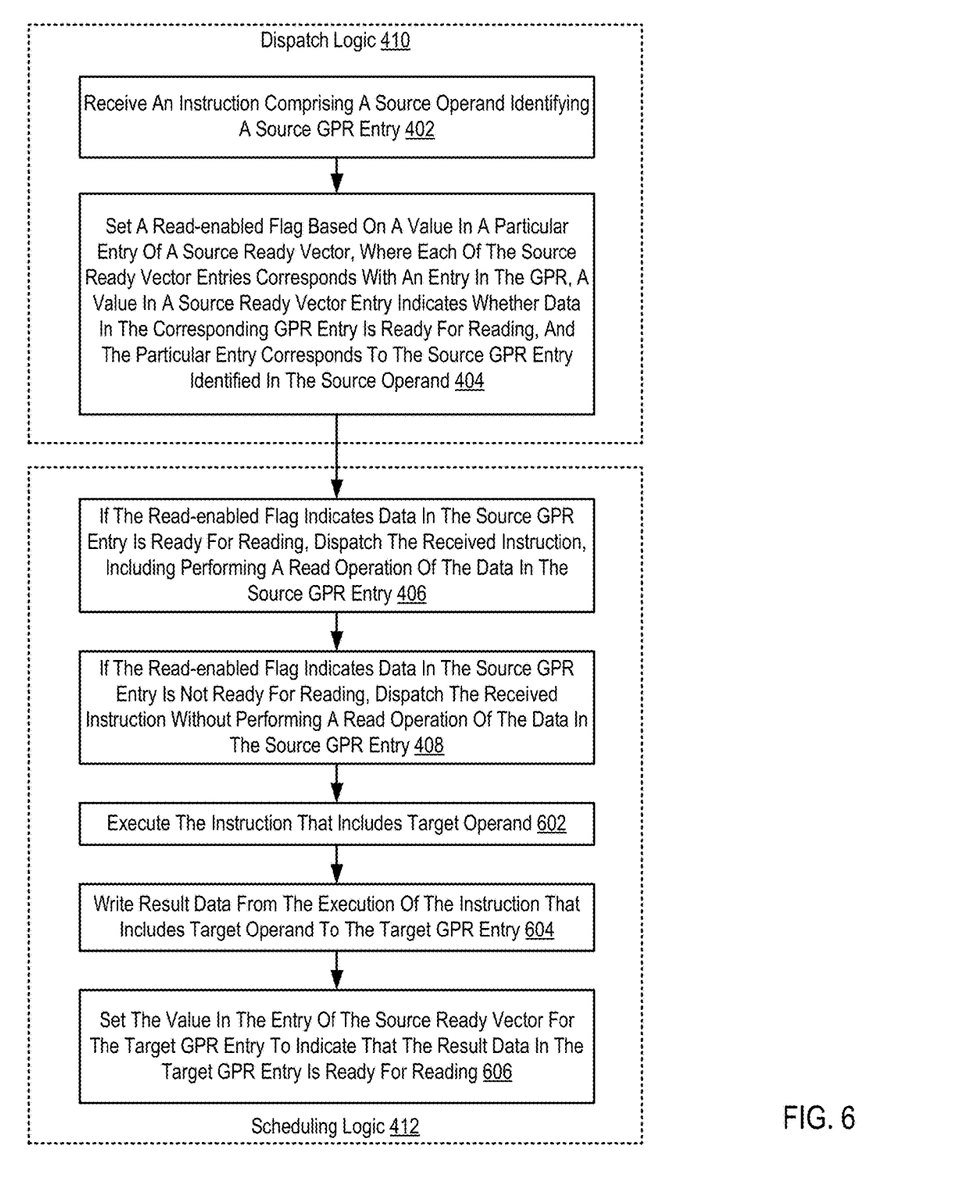
FIG. 6 sets forth a flow chart illustrating an exemplary method for preventing premature reads from a GPR.

For further explanation, FIG. 6 sets forth a flow chart depicting another method for preventing premature reads from a GPR according to embodiments of the present invention. The method of FIG. 6 is similar to the method of FIG. 4 in that the method of FIG. 6 also includes receiving (302) an instruction comprising a source operand identifying a source GPR entry; setting (304) a read-enabled flag based on a value in a particular entry of a source ready vector, wherein each of the source ready vector entries corresponds with an entry in the GPR, a value in a source ready vector entry indicates whether data in the corresponding GPR entry is ready for reading, and the particular entry corresponds to the source GPR entry identified in the source operand; if the read-enabled flag indicates data in the source GPR entry is ready for reading, dispatching (306) the received instruction, including performing a read operation of the data in the source GPR entry; and if the read-enabled flag indicates data in the source GPR entry is not ready for reading, dispatching (308) the received instruction without performing a read operation of the data in the source GPR entry.

The method of FIG. 6 differs from the method of FIG. 4, however, in that in the method of FIG. 6 the received instruction includes, in addition to a source operand, a target operand. To that end, the method of FIG. 6 includes executing (602) the instruction that including the target operand; writing (604) result data from the execution to the target GPR entry; and setting (606) the value in the entry of the source ready vector for the target GPR entry to indicate that the result data in the target GPR entry is ready for reading.

Executing (602) the instruction that includes the target operand may be carried out by providing the data identified by a source operand to an issue queue or execution units for processing in accordance with the instruction and receiving result data from the execution units or load/store slices as a product of the processing. For example, consider an addition instruction that may include two source operands and a target operand. A first source operand may identify first data stored in a first source GPR entry, and a second source operand may identify second data stored in a second source GPR entry. The scheduling logic (312) may provide the first data and second data to the multi-slice processor with the instruction and receive the result data as the addition of the first data and the second data.

Writing (604) result data from the execution of the instruction that includes the target operand to the target GPR entry may be carried out by receiving the result data as the product of the process performed by the multi-slice processor and directing that result data to the target GPR entry identified by the target operand. Continuing with the example above, the result data that is the addition of the first data and the second data may be written to the target GPR entry identified by the target operand.

Setting (606) the value in the entry of the source ready vector for the target GPR entry to indicate that the result data in the target GPR entry is ready for reading may be carried out by switching a bit or vector at the entry in the source ready vector corresponding to the target GPR entry. The value, bit, or vector in the source ready vector may be, for example, switched from a '0' value to a '1' value, where the '1' value indicates that the result data in the target GPR entry is ready for reading, and where the '0' value indicates that the result data in the target GPR entry is not ready for reading.

A subsequent instruction may include a source operand that identifies the target GPR entry. The dispatch logic, upon receiving such an instruction, may set the read-enabled flag for the target GPR entry based on the entry in the source ready vector set in accordance with step 606.

Once the execution of the instruction has been completed and the result data successfully written to the target GPR entry, the value in the entry of the source ready vector for the target GPR entry is left unaltered. Specifically, the value in the entry of the source ready vector for the target GPR entry has previously be altered to indicate that the result data in the target GPR entry is ready for reading. Upon completion of the operation and instruction, the result data is ready to be written, which is reflected in the value in the entry of the source ready vector for the target GPR entry.

Figure 7:
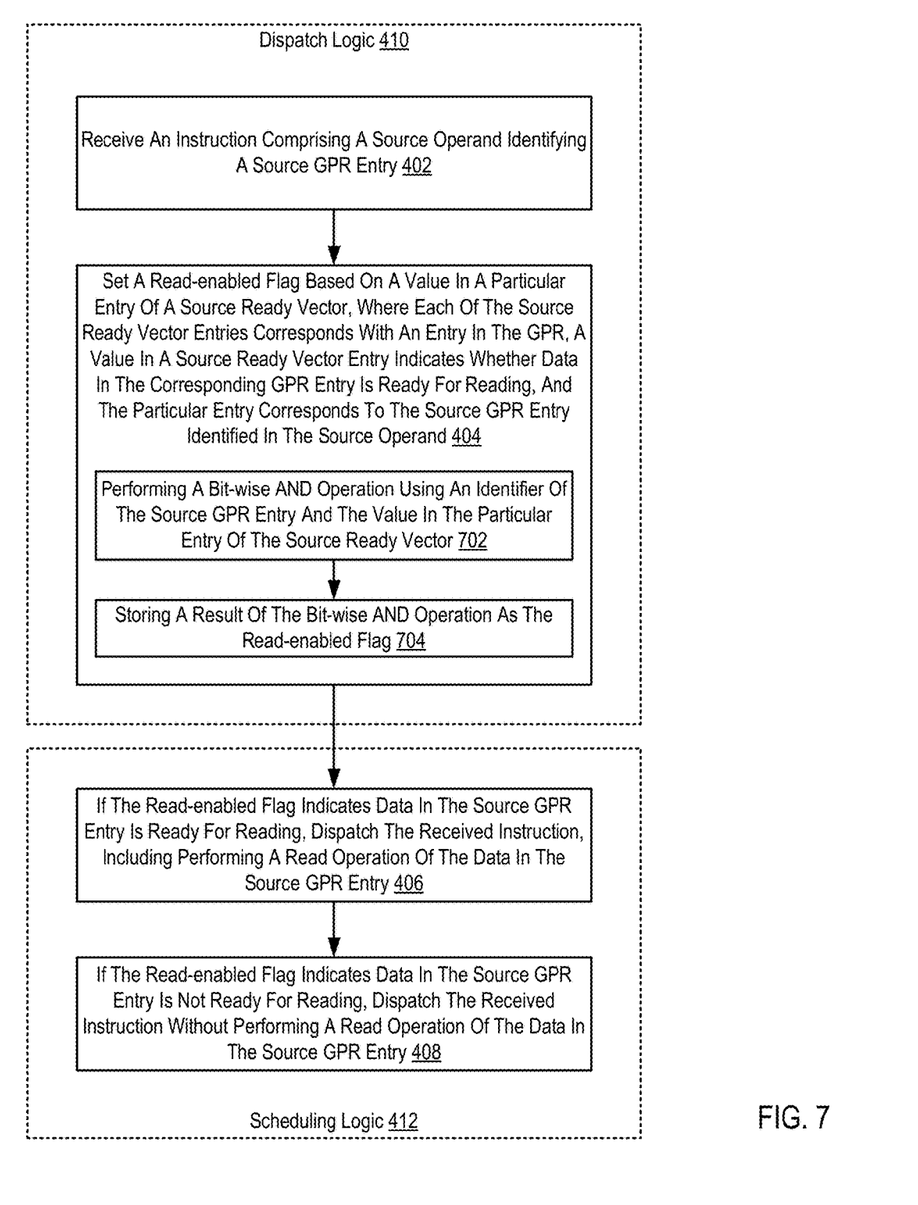
FIG. 7 sets forth a flow chart illustrating an exemplary method for preventing premature reads from a GPR.

For further explanation, FIG. 7 sets forth a flow chart depicting another method for preventing premature reads from a GPR according to embodiments of the present invention. The method of FIG. 7 is similar to the method of FIG. 4 in that the method of FIG. 7 also includes receiving (302) an instruction comprising a source operand identifying a source GPR entry; setting (304) a read-enabled flag based on a value in a particular entry of a source ready vector, wherein each of the source ready vector entries corresponds with an entry in the GPR, a value in a source ready vector entry indicates whether data in the corresponding GPR entry is ready for reading, and the particular entry corresponds to the source GPR entry identified in the source operand; if the read-enabled flag indicates data in the source GPR entry is ready for reading, dispatching (306) the received instruction, including performing a read operation of the data in the source GPR entry; and if the read-enabled flag indicates data in the source GPR entry is not ready for reading, dispatching (308) the received instruction without performing a read operation of the data in the source GPR entry.

The method of FIG. 7 differs from the method of FIG. 4, however, in that in the method of FIG. 7 includes performing (702) a bit-wise AND operation using an identifier of the source GPR entry and the value in the particular entry of the source ready vector; and storing (704) a result of the bit-wise AND operation as the read-enabled flag.

Performing (702) a bit-wise AND operation using an identifier of the source GPR entry and the value in the particular entry of the source ready vector may be carried out by obtaining a value of the identifier of the source GPR entry and the value in the particular entry of the source ready vector. The identifier of the source GPR entry may be, for example, the source operand or a set of values resulting from decoding the source operand. The entry in the source ready vector may be a value or set values (such as a vector) that indicate the data in the source GPR entry is ready to be read. The bit-wise AND operation may be performed using the identifier of the source GPR entry and the value in the entry of the source ready vector to obtain a value or set of values that are stored as the read-enabled flag.

For example, a source operand may be decoded into an address vector containing a set of '0's and a single '1' identifying the source GPR entry. A value in the source ready vector may be a ready vector of equal size to the address vector. The ready vector may include a set of all '1's to indicate that the data in the corresponding source GPR entry is ready to read, or may include a set of all '0's to indicate that the data in the corresponding source GPR entry is not ready to read. A logical AND operation may be performed on each bit of the ready vector and each bit of the corresponding location in the address vector. If the ready vector includes all '0's, the result will be all '0's. If the ready vector includes all '1's, the result will be similar to or the same as the address vector.

Storing (704) a result of the bit-wise AND operation as the read-enabled flag may be carried out by storing the value or set of values obtained from the bit-wise AND operation in a data storage location for the read-enable flag. The value or set of values obtained from the bit-wise AND operation may be manipulated prior to storage. For example, a set of values obtained from the bit-wise AND operation may be manipulated to obtain a single bit representing the result of the bit-wise AND operation. Such manipulation may include storing representative value (such as a '0') if each value in the set of values is equal to that value (such as set of '0' values). Such manipulation may further include storing representative value (such as a '1') if at least one value in the set of values is equal to that value (such as a single '1' in a set of '0' values).

Figure 8:
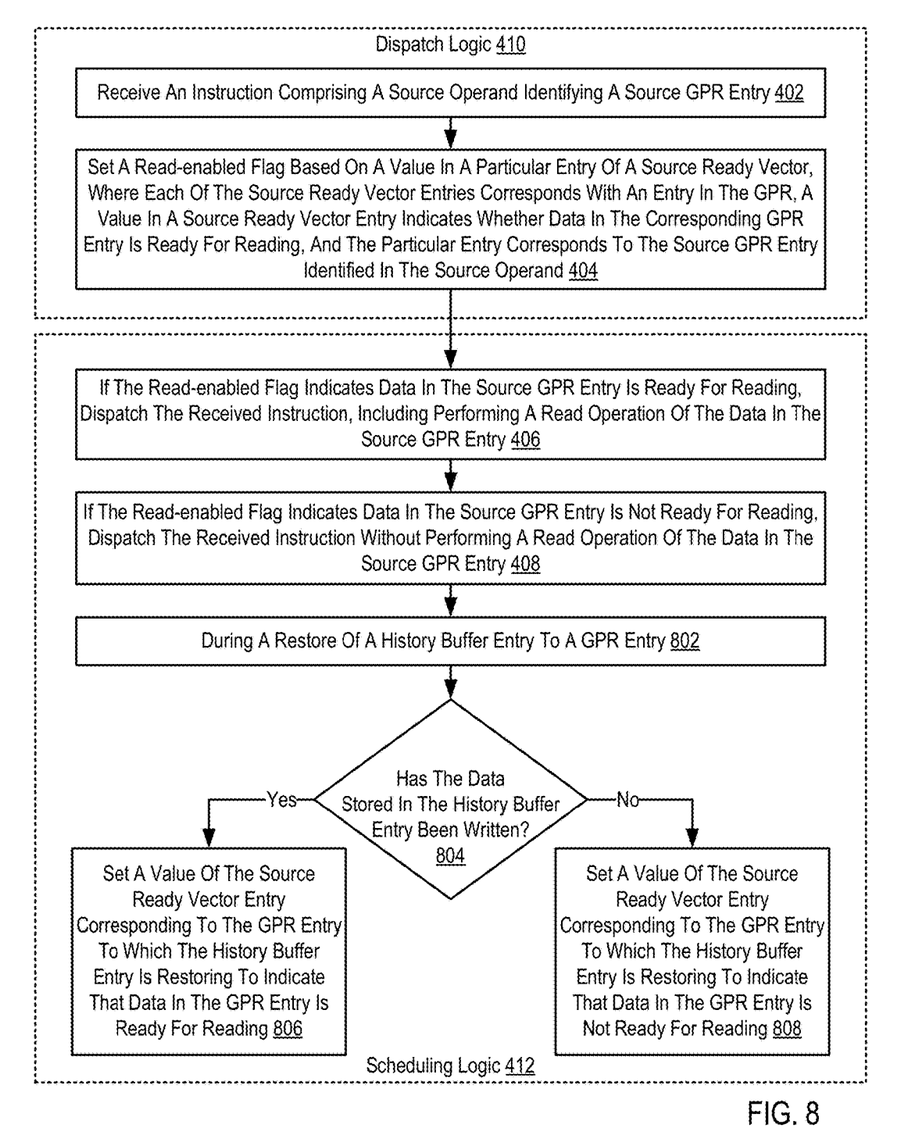
FIG. 8 sets forth a flow chart illustrating an exemplary method for preventing premature reads from a GPR.

For further explanation, FIG. 8 sets forth a flow chart depicting another method for preventing premature reads from a GPR according to embodiments of the present invention. The method of FIG. 8 is similar to the method of FIG. 4 in that the method of FIG. 8 also includes receiving (302) an instruction comprising a source operand identifying a source GPR entry; setting (304) a read-enabled flag based on a value in a particular entry of a source ready vector, wherein each of the source ready vector entries corresponds with an entry in the GPR, a value in a source ready vector entry indicates whether data in the corresponding GPR entry is ready for reading, and the particular entry corresponds to the source GPR entry identified in the source operand; if the read-enabled flag indicates data in the source GPR entry is ready for reading, dispatching (306) the received instruction, including performing a read operation of the data in the source GPR entry; and if the read-enabled flag indicates data in the source GPR entry is not ready for reading, dispatching (308) the received instruction without performing a read operation of the data in the source GPR entry.

The method of FIG. 8 differs from the method of FIG. 4, however, in that in the method of FIG. 8 includes during (802) a restore of a history buffer entry to a GPR entry: determining (804) whether data stored in the history buffer entry has been written; if data in the history buffer entry has been written, setting (806) a value of the source ready vector entry corresponding to the GPR entry to which the history buffer entry is restoring to indicate that data in the GPR entry is ready for reading; and if data in the history buffer entry has not been written, setting (808) a value of the source ready vector entry corresponding to the GPR entry to which the history buffer entry is restoring to indicate that data in the GPR entry is not ready for reading.

A restore of a history buffer entry to the GPR entry (802) may be carried out by moving data stored in an entry in the history buffer into the corresponding GPR entry. Such a restore of a history buffer entry may be triggered by, for example, a GPR flush. For example, the youngest instruction after the flush instruction may be recovered from the history buffer and placed in the GPR entry. Determining (804) whether data stored in the history buffer entry has been written may be carried out by determining whether the instruction that created the data has completed Determining (804) whether data stored in the history buffer entry has been written may also be carried out by reading a value stored with the entry in the history buffer that indicates whether the data is written.

Setting (806) a value of the source ready vector entry corresponding to the GPR entry to which the history buffer entry is restoring to indicate that data in the GPR entry is ready for reading may be carried out by switching, altering, or verifying a bit or vector at an entry in the source ready vector corresponding to the GPR entry to which the history buffer entry is restoring. For example, if the data at the history buffer entry has been written, the value in the source ready vector corresponding to the GPR entry to which the history buffer entry is restoring may be changed to or verified so as to indicate that the data in the GPR entry is ready to be read (e.g., a '1' or vector of '1's)

Setting (808) a value of the source ready vector entry corresponding to the GPR entry to which the history buffer entry is restoring to indicate that data in the GPR entry is not ready for reading may be carried out by switching, altering, or verifying a bit or vector at an entry in the source ready vector corresponding to the GPR entry to which the history buffer entry is restoring. For example, if the data at the history buffer entry has not been written, the value in the source ready vector corresponding to the GPR entry to which the history buffer entry is restoring may be changed to or verified so as to indicate that the data in the GPR entry is not ready to be read (e.g., a '0' or vector of '0's)

Figure 9:
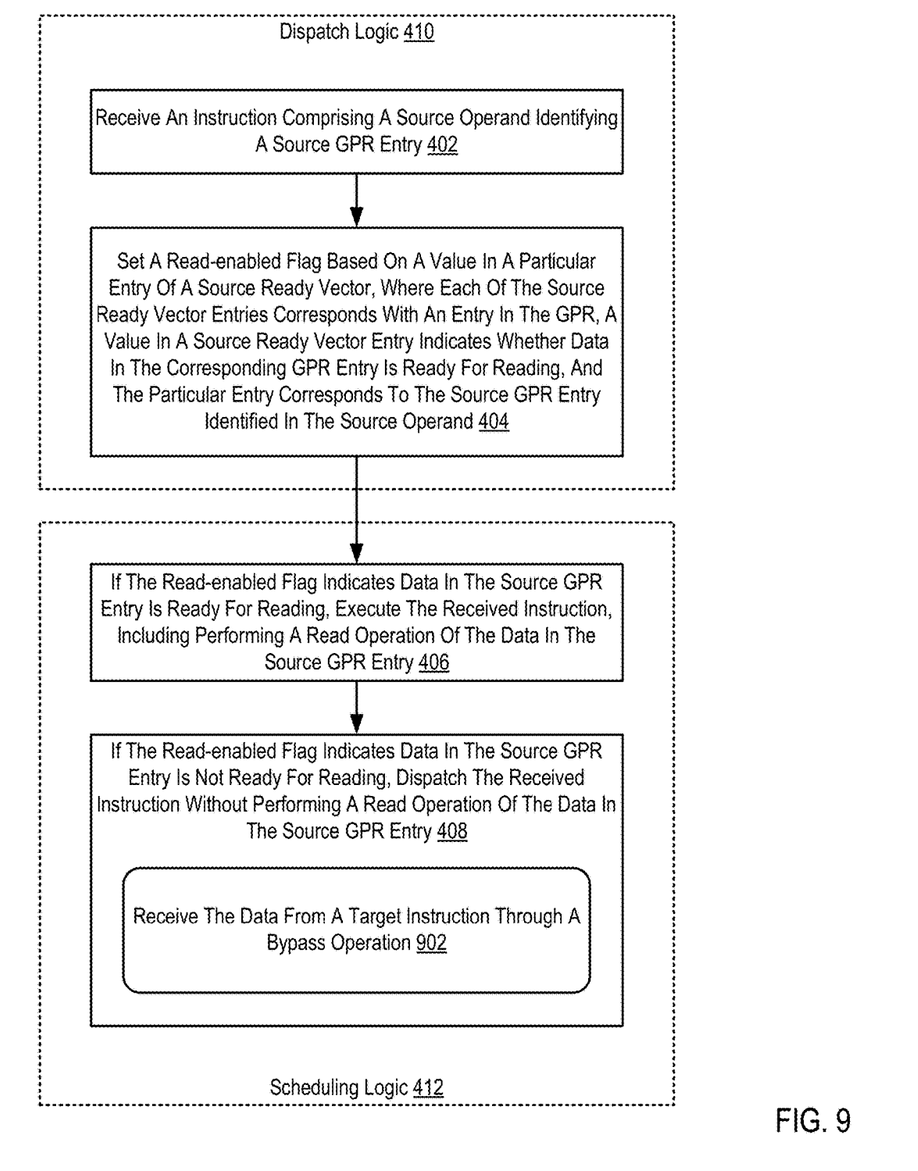
FIG. 9 sets forth a flow chart illustrating an exemplary method for preventing premature reads from a GPR.

For further explanation, FIG. 9 sets forth a flow chart depicting another method for preventing premature reads from a GPR according to embodiments of the present invention. The method of FIG. 9 is similar to the method of FIG. 4 in that the method of FIG. 9 also includes receiving (302) an instruction comprising a source operand identifying a source GPR entry; setting (304) a read-enabled flag based on a value in a particular entry of a source ready vector, wherein each of the source ready vector entries corresponds with an entry in the GPR, a value in a source ready vector entry indicates whether data in the corresponding GPR entry is ready for reading, and the particular entry corresponds to the source GPR entry identified in the source operand; if the read-enabled flag indicates data in the source GPR entry is ready for reading, dispatching (306) the received instruction, including performing a read operation of the data in the source GPR entry; and if the read-enabled flag indicates data in the source GPR entry is not ready for reading, dispatching (308) the received instruction without performing a read operation of the data in the source GPR entry.

The method of FIG. 9 differs from the method of FIG. 4, however, in that if the read-enabled flag indicates data in the source GPR entry is not ready for reading, dispatching (308) the received instruction without performing a read operation of the data in the source GPR entry includes receiving (902) the data from a target instruction through a bypass operation.

Receiving (902) the data from a target instruction through a bypass operation may be carried out using any methods currently known in the art utilizing bypass multiplexing, operand forwarding, or other capable mechanisms.

Exemplary embodiments of the present invention are described largely in the context of a fully functional computer system for preventing premature reads from a GPR. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for preventing premature reads from a general purpose register (GPR), the method comprising:
   receiving an instruction comprising a source operand identifying a source GPR entry, wherein each entry of the GPR includes a bit indicating a read-enabled flag;
   setting the read-enabled flag in the source GPR entry identified in the source operand based on a value in a particular entry of a source ready vector, wherein each of the source ready vector entries corresponds with an entry in the GPR, a value in a source ready vector entry indicates whether data in the corresponding GPR entry is ready for reading, and the particular entry corresponds to the source GPR entry identified in the source operand;
   if the read-enabled flag indicates data in the source GPR entry is ready for reading, dispatching the received instruction, including performing a read operation of the data in the source GPR entry; and
   if the read-enabled flag indicates data in the source GPR entry is not ready for reading, dispatching the received instruction without performing a read operation of the data in the source GPR entry including receiving the data from a target instruction through a bypass operation.

2. The method of claim 1, further comprising:
   for an instruction comprising a target operand identifying a target GPR entry as a destination of result data:
   setting, at dispatch, a value in the source ready vector entry corresponding to the target GPR entry to indicate that result data in the target GPR entry is not ready for reading.

3. The method of claim 2, further comprising:
   executing the instruction comprising the target operand;
   writing result data from the execution to the target GPR entry; and
   setting the value in the entry of the source ready vector for the target GPR entry to indicate that the result data in the target GPR entry is ready for reading.

4. The method of claim 1, wherein setting the read-enabled flag based on the value in the particular entry of the source ready vector further comprises:
  performing a bit-wise AND operation using the source operand identifying the source GPR entry and the value in the particular entry of the source ready vector; and
  storing a result of the bit-wise AND operation as the read-enabled flag.

5. The method of claim 1, further comprising:
  during a restore of a history buffer entry to a GPR entry:
  determining whether data stored in the history buffer entry has been written;
  if data in the history buffer entry has been written, setting a value of the source ready vector entry corresponding to the GPR entry to which the history buffer entry is restoring to indicate that data in the GPR entry is ready for reading; and
  if data in the history buffer entry has not been written, setting a value of the source ready vector entry corresponding to the GPR entry to which the history buffer entry is restoring to indicate that data in the GPR entry is not ready for reading.

6. The method of claim 1, wherein the source ready vector is stored separate from the GPR.

7. A multi-slice processor for preventing premature reads from a general purpose register (GPR), comprising:
  the multi-slice processor including an instruction dispatch network, the GPR, and a source ready vector, wherein each entry in the GPR includes a bit indicating a read-enabled flag, and wherein the source ready vector corresponds to each entry in the GPR, the multi-slice processor configured to carry out the steps of:
  receiving an instruction comprising a source operand identifying a source GPR entry;
  setting the read-enabled flag in the source GPR entry identified in the source operand based on a value in a particular entry of a source ready vector, wherein each of the source ready vector entries corresponds with an entry in the GPR, a value in a source ready vector entry indicates whether data in the corresponding GPR entry is ready for reading, and the particular entry corresponds to the source GPR entry identified in the source operand;
  if the read-enabled flag indicates data in the source GPR entry is ready for reading, dispatching the received instruction, including performing a read operation of the data in the source GPR entry; and
  if the read-enabled flag indicates data in the source GPR entry is not ready for reading, dispatching the received instruction without performing a read operation of the data in the source GPR entry including receiving the data from a target instruction through a bypass operation.

8. The multi-slice processor of claim 7, further configured to carry out the steps of:
  for an instruction comprising a target operand identifying a target GPR entry as a destination of result data:
  setting, at dispatch, a value in the source ready vector entry corresponding to the target GPR entry to indicate that result data in the target GPR entry is not ready for reading.

9. The multi-slice processor of claim 8, further configured to carry out the steps of:
  executing the instruction comprising the target operand;
  writing result data from the execution to the target GPR entry; and
  setting the value in the entry of the source ready vector for the target GPR entry to indicate that the result data in the target GPR entry is ready for reading.

10. The multi-slice processor of claim 7, wherein setting the read-enabled flag based on the value in the particular entry of the source ready vector further comprises:
  performing a bit-wise AND operation using the source operand identifying the source GPR entry and the value in the particular entry of the source ready vector; and
  storing a result of the bit-wise AND operation as the read-enabled flag.

11. The multi-slice processor of claim 7, further configured to carry out the steps of:
  during a restore of a history buffer entry to a GPR entry:
  determining whether data stored in the history buffer entry has been written;
  if data in the history buffer entry has been written, setting a value of the source ready vector entry corresponding to the GPR entry to which the history buffer entry is restoring to indicate that data in the GPR entry is ready for reading; and
  if data in the history buffer entry has not been written, setting a value of the source ready vector entry corresponding to the GPR entry to which the history buffer entry is restoring to indicate that data in the GPR entry is not ready for reading.

12. The multi-slice processor of claim 7, wherein the source ready vector is stored separate from the GPR.

13. An apparatus for preventing premature reads from a general purpose register (GPR), comprising:
  a multi-slice processor including an instruction dispatch network, the GPR, and a source ready vector, wherein each entry in the GPR includes a bit indicating a read-enabled flag, and wherein the source ready vector corresponds to each entry in the GPR, the multi-slice processor configured to carry out the steps of:
  receiving an instruction comprising a source operand identifying a source GPR entry;
  setting the read-enabled flag in the source GPR entry identified in the source operand based on a value in a particular entry of a source ready vector, wherein each of the source ready vector entries corresponds with an entry in the GPR, a value in a source ready vector entry indicates whether data in the corresponding GPR entry is ready for reading, and the particular entry corresponds to the source GPR entry identified in the source operand;
  if the read-enabled flag indicates data in the source GPR entry is ready for reading, dispatching the received instruction, including performing a read operation of the data in the source GPR entry; and
  if the read-enabled flag indicates data in the source GPR entry is not ready for reading, dispatching the received instruction without performing a read operation of the data in the source GPR entry including receiving the data from a target instruction through a bypass operation.

14. The apparatus of claim 13, further configured to carry out the steps of:
  for an instruction comprising a target operand identifying a target GPR entry as a destination of result data:
  setting, at dispatch, a value in the source ready vector entry corresponding to the target GPR entry to indicate that result data in the target GPR entry is not ready for reading.

15. The apparatus of claim 14, further configured to carry out the steps of:

executing the instruction comprising the target operand;
writing result data from the execution to the target GPR entry; and
setting the value in the entry of the source ready vector for the target GPR entry to indicate that the result data in the target GPR entry is ready for reading.

16. The apparatus of claim 13, wherein setting the read-enabled flag based on the value in the particular entry of the source ready vector further comprises:
performing a bit-wise AND operation using the source operand identifying the source GPR entry and the value in the particular entry of the source ready vector; and
storing a result of the bit-wise AND operation as the read-enabled flag.

17. The apparatus of claim 13, further configured to carry out the steps of:
during a restore of a history buffer entry to a GPR entry:
determining whether data stored in the history buffer entry has been written;
if data in the history buffer entry has been written, setting a value of the source ready vector entry corresponding to the GPR entry to which the history buffer entry is restoring to indicate that data in the GPR entry is ready for reading; and
if data in the history buffer entry has not been written, setting a value of the source ready vector entry corresponding to the GPR entry to which the history buffer entry is restoring to indicate that data in the GPR entry is not ready for reading.

* * * * *